United States Patent [19]
Gehrmann et al.

[11] Patent Number: 5,527,458
[45] Date of Patent: Jun. 18, 1996

[54] DEVICE FOR CONTINUOUS FILTRATION AND DRYING OF A SOLID SUSPENSION

[75] Inventors: Dietrich Gehrmann; Norbert Schweigler, both of Leverkusen, Germany

[73] Assignee: Bayer Aktiengesellschaft, Leverkusen, Germany

[21] Appl. No.: 327,179

[22] Filed: Oct. 21, 1994

[30] Foreign Application Priority Data

Oct. 28, 1993 [DE] Germany .......................... 43 36 736.4

[51] Int. Cl.[6] .............................. F26B 23/00; C02F 11/12
[52] U.S. Cl. ........................ 210/177; 210/178; 210/180; 210/181; 210/297; 210/386; 210/400; 34/68; 34/216; 34/217
[58] Field of Search ................. 34/68, 418, 426, 34/216, 217, 419, 420, 421; 210/177, 178, 179, 180, 181, 184, 386, 400, 297, 771

[56] References Cited

U.S. PATENT DOCUMENTS

| | | | |
|---|---|---|---|
| 2,736,434 | 2/1956 | Yacoe | 210/178 |
| 3,294,554 | 12/1966 | Osborne et al. | 34/216 |
| 3,502,216 | 3/1970 | Dittman | 210/179 |
| 4,567,673 | 2/1986 | Böhnensieker | 34/216 |
| 4,831,746 | 5/1989 | Kim et al. | 34/216 |
| 4,887,362 | 12/1989 | Rautakorpi | 34/216 |
| 5,091,079 | 2/1992 | Gayman | 210/175 |
| 5,133,883 | 7/1992 | Prinssen | 210/386 |
| 5,173,272 | 12/1992 | Roland | 34/216 |
| 5,233,763 | 8/1993 | Minnie, Jr. | 34/68 |
| 5,357,881 | 10/1994 | Elcik et al. | 34/216 |

FOREIGN PATENT DOCUMENTS

| | | |
|---|---|---|
| 0465951 | 1/1992 | European Pat. Off. . |
| 0465950 | 1/1992 | European Pat. Off. . |
| 262495 | 8/1911 | Germany . |
| 1272888 | 7/1968 | Germany . |
| 1604922 | 8/1972 | Germany . |
| 2360576 | 6/1974 | Germany . |
| 2414324 | 10/1974 | Germany . |
| 2411306 | 9/1975 | Germany . |
| 2456956 | 8/1976 | Germany . |
| 2754386 | 6/1978 | Germany . |
| 3115868 | 11/1982 | Germany . |
| 3245231 | 7/1983 | Germany . |
| 3703606 | 8/1988 | Germany . |
| 678282 | 8/1991 | Switzerland . |
| 1146529 | 3/1985 | U.S.S.R. .................. 34/216 |

Primary Examiner—Peter A. Hruskoci
Assistant Examiner—Theodore M. Green
Attorney, Agent, or Firm—William C. Gerstenzang; Sprung Horn Kramer & Woods

[57] ABSTRACT

The device for continuous filtration and drying of a solid suspension comprises a belt filter (1) and downstream a belt drier (2). By use of a porous conveyor belt (3) the filter cake generated in the belt filter (1) is conveyed further into the belt drier (2) in which there are provided heating devices for heating and drying the filter cake (7) which is on the conveyor belt (3). After leaving the belt filter (1), the filter cake (7) is present on the conveyor belt (3) in the form of a gas-permeable bed of solids in layer form having a maximum layer thickness of 50 mm, preferably a maximum of 20 mm. The heating devices in the belt drier (2) comprise, on the one hand, a hot gas chamber (8) disposed above the conveyor belt (3) to generate a hot gas which flows through the bed of solids downwardly from above and, on the other hand, one or more contact heating elements (10, 15, 18, 19, 20, 22) disposed above and/or below the conveyor belt (3).

10 Claims, 5 Drawing Sheets

DEVICE FOR CONTINUOUS FILTRATION AND DRYING OF A SOLID SUSPENSION

The invention relates to a device for continuous filtration of a solid suspension and drying of the filter cake remaining on a porous conveyor medium, with the conveyor medium being guided through a belt filter and downstream a belt drier having heating means for introducing heat into the filter cake.

According to prior art, filters and driers such as are, for example, described in DE 2 754 386, DE 2 360 576 and DE 2 830 755 are utilised for mechanical separation of the solid from the liquid phase and for heat-treating the filter residue of a solid suspension. These devices, hereinbelow called filter driers for the sake of brevity, generally allow the substances which are to be removed to be separated by a succession of sequential process steps in a single apparatus. This apparatus incorporates filtration, mechanical dehumidification, washing and thermal drying.

The disadvantages of the filter driers known hitherto are either the discontinuous nature of their mode of operation or the inadequacy of thermal drying for certain products. A continuous mode of operation, which relies on the sequential nature of continuously operated apparatus such as filters, centrifuges and driers, usually requires a transfer stage taking the form of pumps, metering screws and the like. The associated charging and discharging involving intermediate or buffer vessels is frequently associated with difficulties. Distribution of the moist filter residue on the conveyor medium of the drier (drier belt) is moreover not always even. This results in uneven drying.

Some products depend particularly on maximum "gentleness" of transfer from mechanical dehumidification to thermal drying. This means that the product must be subjected to the least possible mechanical stress in order to avoid particle breakdown and associated dust formation. In the case of products whereof the moisture is water and or those which are hygroscopic, residence time in the drying zone is an essential criterion in utilising continuous filter driers, because the apparatus must be kept to a size which is reasonable technically. Convection drying, which relies on through-absorption of only moderately hot air, in particular in the case of filter cakes having a sizeable layer depth, is frequently inadequate to achieve the required residual moisture content within a predetermined reasonable residence time. There is, inter alia, insufficient mastery of generating evenly formed, shallow filter cakes, such as would be advantageous for short drying times.

The essential component of a continuous filter drier is an endless porous conveyor medium which passes through both the filtration and the drier zones. The product for treatment is charged on to the conveyor medium by means of known metering devices. After leaving the drying zone, the product is removed from the conveyor medium by simple deflection and/or by means of scrapers. The technical solutions which have been known hitherto have the disadvantage of being usable in the main only for products whereof the moisture is solvent and which lend themselves well to drying.

The invention proceeds from this point. The object was to develop a combined apparatus for filtering and drying solid suspensions, in which the product is subjected at the most only to low thermal and mechanical stress, thus enabling even sensitive products to be treated or produced without loss of quality. The apparatus should furthermore have a low specific floor area requirement and exhibit maximum flexibility in terms of add-on capability.

This object is achieved according to the invention by a belt filter in conjunction with downstream a belt drier, in that the filter cake after leaving the belt filter is present on the conveyor medium in the form of a gas-permeable bed of solids in layer form having a maximum layer thickness of 50 mm, preferably a maximum of 20 mm, and in that the heating means in the belt drier comprise, on the one hand, a hot gas chamber disposed above the conveyor medium for generating a hot gas which flows through the bed of solids downwardly from above and, on the other, one or more contact heating elements disposed above and/or below the conveyor medium.

The contact heating element comprises preferably an endless perforated heating belt which moves above the conveyor medium and is in contact with the bed of solids.

Alternatively, the contact heating element may also comprise a heated perforated plunger disposed above the conveyor medium and capable of travel perpendicular to the conveyor medium. A plurality of plungers which are capable of travel perpendicular to the conveyor medium may naturally also be provided in lieu of one plunger.

A further possibility is that the contact heating elements comprise heated perforated filtrate troughs disposed below the conveyor medium, whereof the surfaces are in contact with the conveyor medium and are hence also indirectly in contact with the the bed of solids.

Finally, the contact heating elements may also comprise heated rollers disposed below the conveyor medium, whereof the surfaces are in contact with the conveyor medium. A further improvement comprises attaching doctoring elements in the form of rakes or brushes between the belt filter and the belt drier to break up the bed of solids. However, breaking-up may also occur as a result of the contact heating elements themselves which comprise for this purpose heated blades which are disposed above the conveyor medium and protrude into the bed of solids.

A further embodiment consists in disposing radiant heaters in the hot gas chamber to provide an additional heating of the bed of solids by radiant heat.

The conveyor medium for the filter cake and the heating belt for the contact heating are expediently constructed in a material having high-temperature stability up to 230° C.

The complete apparatus, that is to say the belt filter and the belt drier, including any accessory parts, is advantageously accommodated in a common pressure-resistant housing.

The invention affords the following advantages:
a) different types of drying may be achieved and in particular be combined (contact drying, convection drying, radiant heat drying). A substantial increase in the evaporative capacity can be achieved over that of known filter driers by combining different types of drying in a manner appropriate to the product.
b) Even, gentle drying of the evenly formed and relatively shallow filter cake is also possible, thus making for more efficient dehumidification. The risk of product damage arising as a result of excessive thermal stress is minimised.
c) By using conveyor belts (conveyor medium) having high-temperature stability, drying may be carried out at higher temperatures than hitherto.
d) The exhaust vapours arising from filter cake heating may be removed laterally or downwardly without problems. It is moreover possible for the convection through-flow drying to be a virtually dust-free operation.
e) The apparatus meets all the preconditions for equipping with fully automatic control means based on air intake, vent air and product temperature measurements.

f) The versatility of the device enables it to be utilised for organic and inorganic products, in particular for drying surface-moist products, and also mechanically sensitive or toxic products.

g) As a result of the more even de-humidification, drying and optionally also washing, and as a result of lower friction during conveying, product quality is improved.

h) A further improvement is achieved in terms of occupational hygiene, with lower levels of dust and vapour generation.

i) The high specific drying rate leads to a clear reduction in costs (capital and operating). For the same reason greater operational safety is also achieved, since relatively low apparatus volumes (product hold-up) are involved (lower hazard potential).

j) There is further advantage in the fact that all process steps may be carried out both under pressure and under vacuum.

k) The apparatus according to the invention may furthermore be constructed in modular manner on the construction kit principle. It has a low specific floor area requirement.

l) Accessory parts, for example for mechanical dehumidification, may be readily incorporated.

The invention is described in greater detail below with the aid of schematic drawings and sample embodiments, in which:

Figure 1:
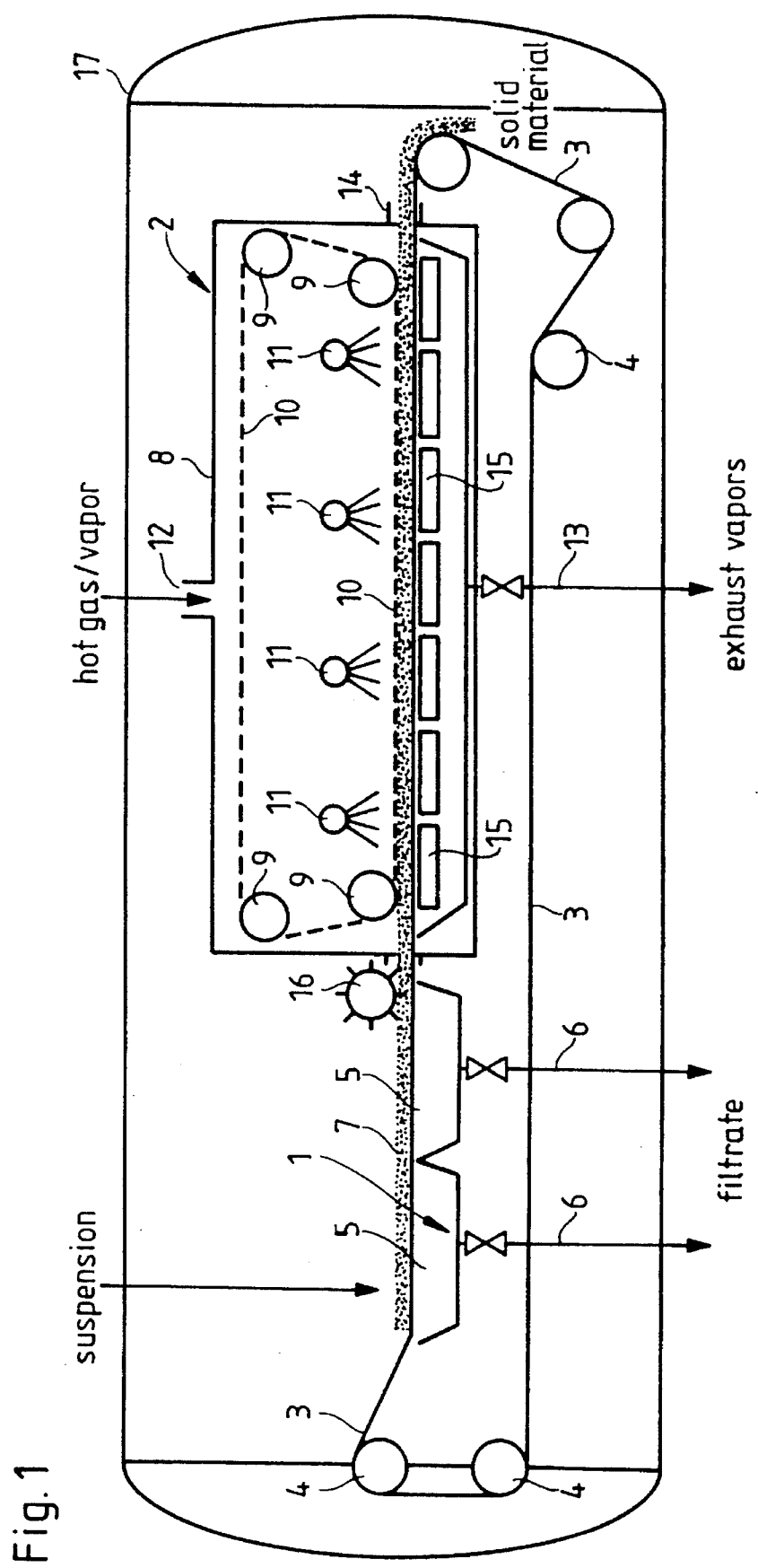
FIG. 1: shows the structure of a continuous filter drier having convection drying by hot air and contact drying by means of a heating belt and optionally heated filtrate troughs.

The combined filter drier according to FIG. 1 comprises substantially the belt filter 1 and downstream the belt drier 2. An endless perforated conveyor belt 3 which is guided through the belt filter 1 and the belt drier 2 serves as the conveyor medium. The conveyor belt 3 is guided by belt rollers 4.

The solid suspension for treatment is charged on to the conveyor belt 3 in the region of the belt filter 1 and is then filtered. The volume flow of suspension having a known solids content is charged in metered manner on to the unoccupied filter area of the belt filter such that after filtration an even, gas-permeable bed of solids in layer form having a maximum layer thickness of 50 mm, preferably a maximum of 20 mm, is present on the conveyor belt 3. The liquid phase is captured in the filtrate troughs 5 below the conveyor belt 3 and is removed by the filtrate lines 6.

The solid is separated from the liquid by applying a pressure difference (generally a vacuum). The filter cake 7 may then be washed before mechanical dewatering to achieve as low a residual moisture content as possible (not shown in the diagram).

The dehumidified filter cake is next conveyed on the conveyor belt 3 into the belt drier 2. The belt drier 2 here comprises substantially a heating gas chamber 8 and a heating belt 10 installed therein and guided by way of the rollers 9. The heating belt 10 having high-temperature stability is heated by radiant heating elements 11 which are also disposed within the heating gas chamber 8. Hot air nozzles may also be installed in the heating gas chamber in place of the radiant heating elements for heating the heating belt 10. The heating belt 10 is in contact with the surface of the filter cake 7 in the longitudinal direction, in order to afford good heat transmission from the heating belt into the filter cake.

Hot air or superheated steam is supplied to the hot gas chamber 8 by way of the connection pieces 12. The hot gas flows through the filter cake 7 downwardly from above and, together with the exhaust vapours which arise, is removed below the conveyor belt 3 by the exhaust vapour line 13. After drying, the solid is transferred outward through the drier outlet 14 and may be removed from the conveyor belt by simple deflection of the conveyor belt 3 or by other devices known to a person skilled in the art. The conveyor belt 3 zone on which the filter cake 7 previously lay may then be cleaned before the said zone is advanced once more into the belt filter 1.

An essential feature of the drying is the combination of convection and contact heating to introduce heat into the filter cake. The heating belt 10 introduces heat from the upper side into the filter cake 7. A further improvement in the heat yield may be achieved if the filter cake 7 is additionally heated on the underside. For this purpose there may be installed heated filtrate troughs 15 in the belt drier 2 below the conveyor belt 3, whereof the surface is in contact with the underside of the conveyor belt. The filtrate troughs 15 are provided with vertical studs on which the conveyor belt 3 bears. In this embodiment the conveyor belt 3 must be of a material affording good thermal conductivity, because the heat is introduced by the heated filtrate troughs 15 by way of the conveyor belt 3 from the underside into the filter cake 7. It is naturally also possible to connect a plurality of heating belt units sequentially in the hot gas chamber 8 in place of a single heating belt 10. It is furthermore conceivable to dispense entirely with the upper contact heating elements and to yield heat exclusively from the underside by way of the heated filtrate troughs 15.

Figure 2:
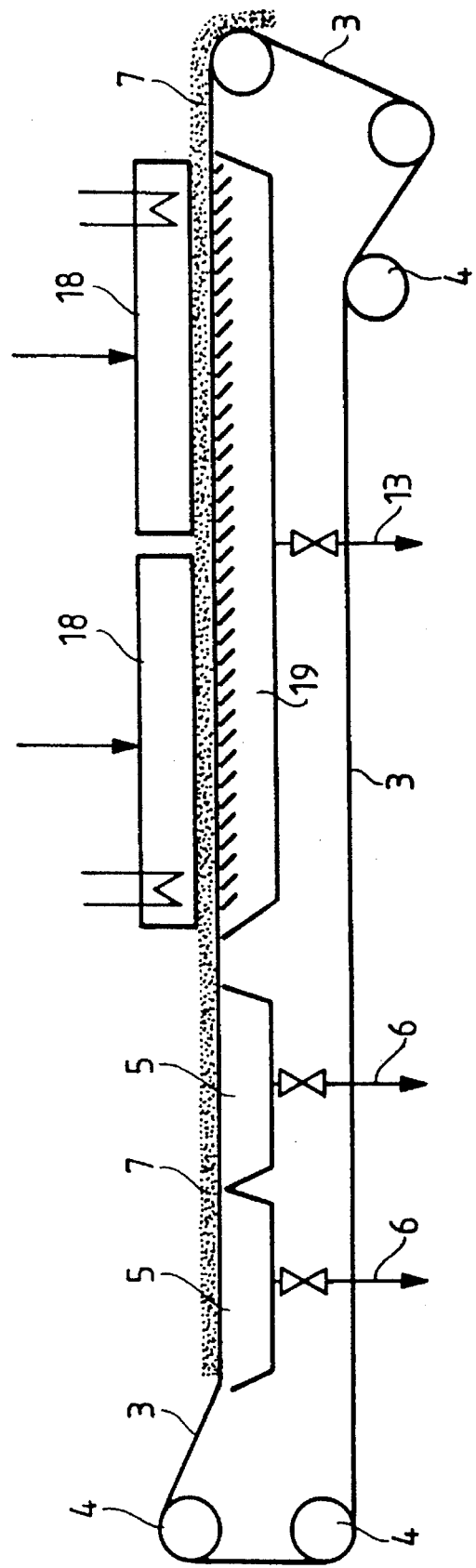
FIG. 2: shows a filter drier having convection drying and heating plungers as contact heating elements.

It is in many cases necessary for the bed of solids in layer form or the filter cake 7 to be broken up after leaving the belt filter 1 in order to ensure that the flow resistance is sufficiently low during the hot gas convection drying in the belt drier 2. For this purpose there is attached between the belt filter 1 and the belt drier 2 a breaking-up device 16 which extends over the entire width of the conveyor belt 3. The breaking-up device 16 may comprise, for example, doctoring elements in the form of rakes or spiked rollers. The belt filter 1 and the belt drier 2 are expediently included in a pressure-resistant common housing 17, such that both units of the apparatus are enclosed. This enables the filter drier to be operated at any pressure. Moreover, this meets occupational hygiene requirements. FIG. 2 shows a different embodiment of the belt drier. The contact heating elements here comprise heated plungers 18 which are disposed above the conveyor belt 3 and which are capable of travel perpendicular to the conveyor belt. The plungers 18 are perforated, thus again enabling a stream of hot gas to be supplied in the filter cake 7 for convection drying. There is provided on the underside of the conveyor belt 3 in the belt drier (as an option) an elongated heated filtrate trough 19 to enable an additional contact heating to emanate from the underside. The filter drier in accordance with FIG. 2 is in other respects constructed in a manner analogous to FIG. 1. The hot gas chamber 8 and the external housing 17 have been omitted for ease of viewing.

Figure 3:
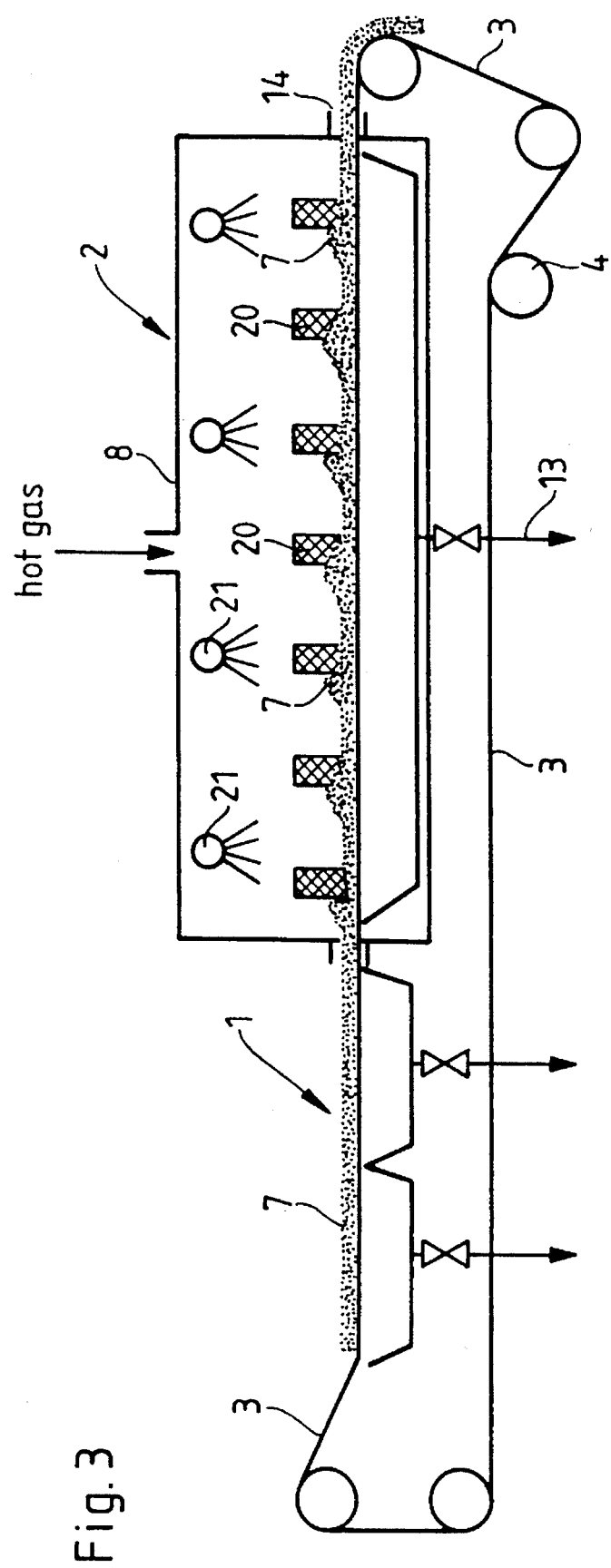
FIG. 3: shows a filter drier having convection drying and ploughshare-like heating elements.

A further variant of the filter drier is illustrated in FIG. 3. The contact heating elements in the belt drier 2 in this instance comprise heated, ploughshare-like blades 20 which protrude into the bed of solids. The ploughshare blades 20 ensure simultaneously that the filter cake 7 is broken up. It is in this way possible to dispense with the breaking-up device between the belt filter 1 and the belt drier 2, which is described in the context of FIG. 1. The ploughshare blades 20 are heated by radiant heaters 21 in the hot gas chamber 8. The radiant heaters 21 also bring about direct additional heating of the filter cake 7 by radiant heat.

Figure 4:
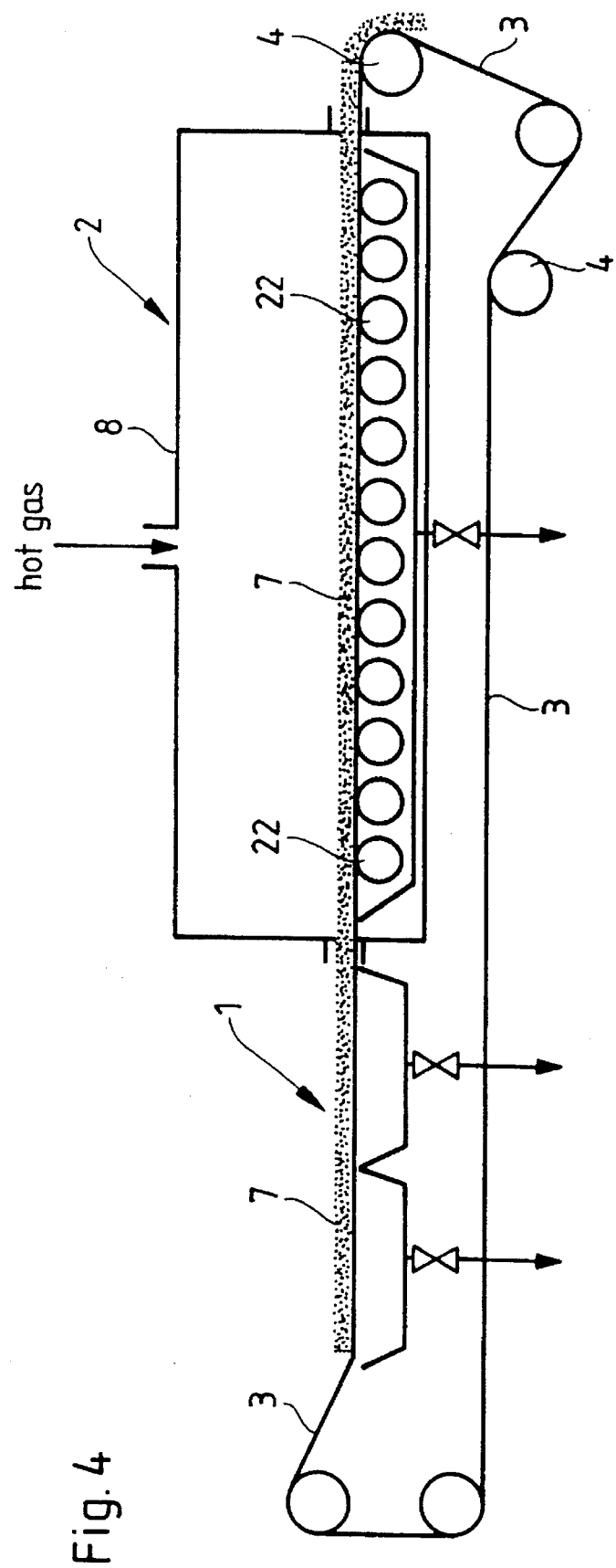
FIG. 4: shows a filter drier having convection drying and roll heating.

FIG. 4 shows a further embodiment of the combined filter drier, in which the contact heating elements in the belt drier 2 comprise heated rollers 22. The rollers 22 are in contact with the conveyor belt 3, that is to say the conveyor belt 3 is guided in the belt drier 2 by way of the rollers 22. The rollers may be heated by radiant heating elements, in a manner similar to the ploughshare elements in the embodiment in accordance with FIG. 3.

Figure 5:
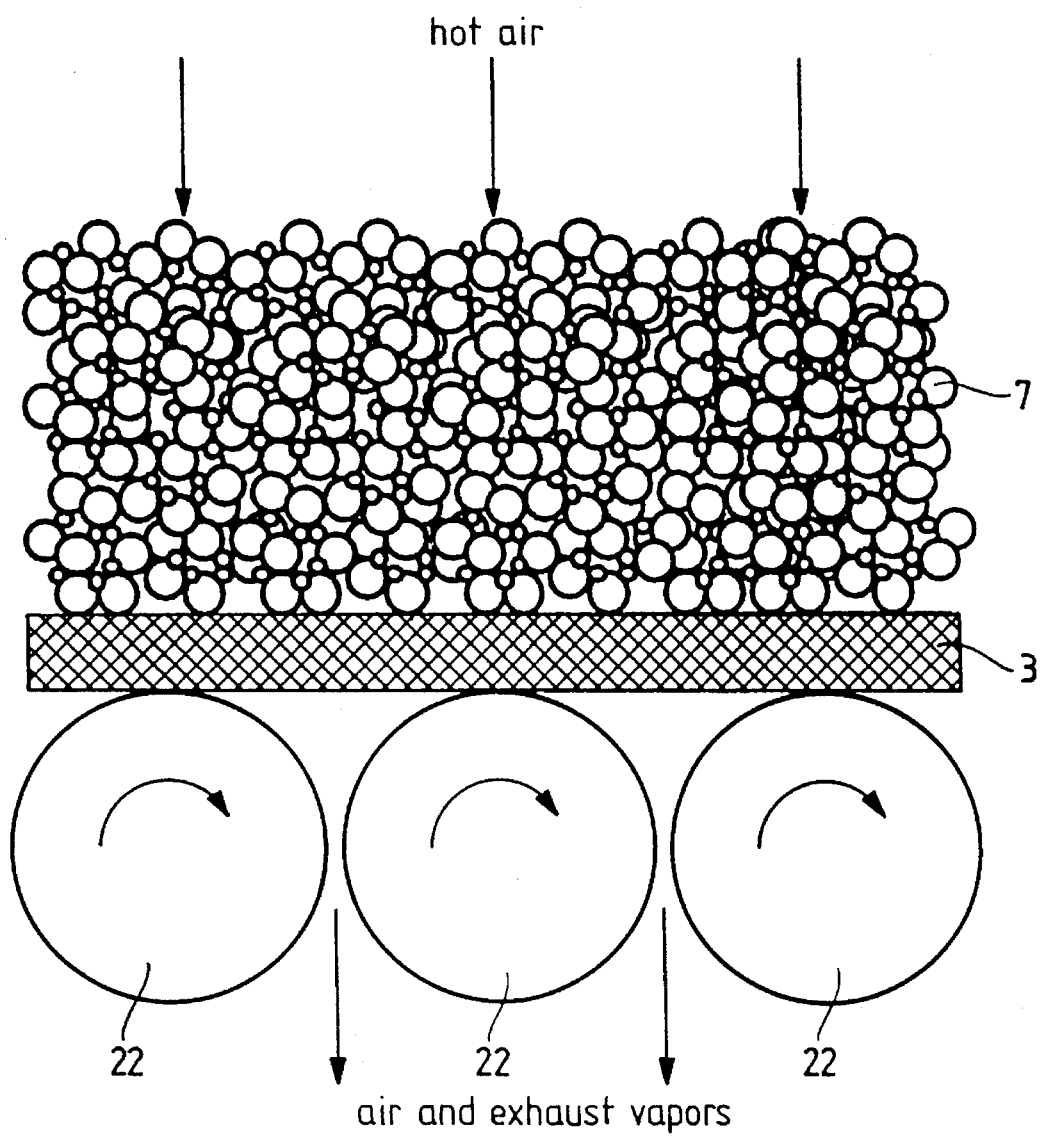
FIG. 5: is an enlarged representation of the filter cake on the conveyor belt, with the contact heating elements in roller form.

FIG. 5 again shows in detail the heat yield into the filter cake by means of heated rollers. In a manner analogous to the embodiment according to FIG. 1, hot air flows downwardly from above into the filter cake 7. The exhaust vapour-enriched air is able to flow away between the rollers 22.

In the case of the embodiments in which the contact heating elements (filter troughs 15, heated rollers 22) are disposed below the conveyor belt 3, the conveyor belt 3 must be of a material having sufficiently high thermal conductivity to ensure good heat transmission to the filter cake 7. This requirement is generally met by conventional commercial filter cloths. The filter cloth is also permeable (porosity) to the hot air and the exhaust vapours released from the filter cake. In particularly severe conditions a porous metal sheet may also be used as the conveyor belt. In the case of all the embodiments according to FIGS. 1 to 5 the conveyor belt 3 passes throughout, that is to say the conveyor belt 3 is common to both apparatus units, the belt filter and the belt drier. The two apparatus units may also be equipped with separate conveyor belts in lieu of one common conveyor belt. Where this is the case, however, there must be provided transfer device at the point of connection between the two conveyor belts.

The combined filter drier according to FIGS. 1 to 5 operates in quasi-continuous manner. In a first operating cycle, for example, when the conveyor belt is stationary, the belt filter is charged with the solid suspension for treatment, which is then filtered. The conveyor belt is then set in motion, and the filter cake 7 remaining after filtration is advanced into the belt drier 2. In the second operating cycle the filter cake 7 is now dried, as described, by combined convection and contact heating. The belt filter may during this period already be charged with new solid suspension. Depending on the embodiment of the combined filter drier, the conveyor belt is also moved in continuous manner. Where this is the case, the contact heating elements are preferably constructed according to FIGS. 1, 3 and 4.

The filter drier according to the invention operates with a specific hot air throughput of from 200 to 5000 $m^3_N/m^2$ per hour. The heat yield in the case of contact heating is from approximately 20% to 80%. The maximum hot air intake (hot gas) temperature is 250° C., and the maximum temperature of the contact heating elements also 250° C. The particle size of the product to be dried has proved to be not critical (from 50 µm to 1000 µm). The depth of the filter cake remaining on the conveyor belt after filtration is between 3 mm and 50 mm, preferably between 3 mm and 20 mm. Experience shows the drying duration for one charge to be from 5 min to 20 min.

We claim:

1. A device for filtering and drying a solid suspension, comprising a) a previous conveyor belt, b) a filtration zone through which said belt passes, said filtration zone having a metering device by which a suspension to be treated can be metered onto said belt, whereby liquid contained in said suspension can be drawn off below said belt and solids contained in said suspension can be retained on said belt in the form of a gas permeable bed of solids having a thickness equal to or less than 50 mm;

c) a heating zone through which said belt passes after having passed through said filtration zone, said heating zone comprising a source of hot gas and means for directing said hot gas through said solids and said belt, and further comprising heating elements disposed above said belt, which can be brought into contact with said solids, heating elements disposed below said belt, which can be brought into contact with said solids, or both of said heating elements.

2. Device according to claim 1, wherein the contact heating element comprises an endless perforated heating belt (10) which moves above the conveyor medium (3) and is in contact with the bed of solids.

3. Device according to claim 2, wherein the conveyor medium (3) and the heating belt (10) are of a material which is heat-resistant to temperatures of 230° C.

4. (Amended) Device according to claim 1, wherein the contact heating elements comprise heated perforated plungers (18) disposed above the conveyor medium (3) and capable of travel perpendicular to the conveyor medium (3).

5. Device according to claim 1, wherein the contact heating elements comprise heated filtrate troughs (15, 19) which are disposed below the conveyor medium and provided with studs, and whereof the surface are in contact with the conveyor medium (3).

6. Device according to claim 1, wherein the contact heating elements comprise heated rollers (22) disposed below the conveyor medium (3), whereof the surfaces are in contact with the conveyor medium (3).

7. Device according to claim 1, wherein there are disposed between the belt filter (1) and the belt drier (2) doctoring elements in the form of rakes or spiked rollers (16) for breaking up the bed of solids.

8. Device according to claim 1, wherein the contact heating elements comprise heated blades (20) which are disposed above the conveyor medium and protrude into the bed solids.

9. Device according to claim 1, wherein there are disposed in the hot gas chamber (8) radiant heaters (21) to provide an additional heating of the bed of solids by radiant heat.

10. Device according to claim 1, wherein the belt filter (1) and the belt drier (2) are enclosed by a common pressure-resistant housing (17).

* * * * *

UNITED STATES PATENT AND TRADEMARK OFFICE
CERTIFICATE OF CORRECTION

PATENT NO. : 5,527,458
DATED      : June 18, 1996
INVENTOR(S) : Gehrmann, et al.

It is certified that error appears in the above-indentified patent and that said Letters Patent is hereby corrected as shown below:

Col. 6, claim 1    Delete " pervious " and substitute
line 3             -- porous --

Col. 6, line 45    Delete " surface " and substitute
                   -- surfaces --

Signed and Sealed this

Twenty-sixth Day of November 1996

Attest:

BRUCE LEHMAN

*Attesting Officer*    *Commissioner of Patents and Trademarks*